April 28, 1931.  R. L. CHAPMAN  1,802,499

HOSE CLAMP

Filed Oct. 9, 1929

INVENTOR:—
Ralph L. Chapman.
By Martin P. Smith Atty.

Patented Apr. 28, 1931

1,802,499

UNITED STATES PATENT OFFICE

RALPH L. CHAPMAN, OF SANTA ANA, CALIFORNIA

HOSE CLAMP

Application filed October 9, 1929. Serial No. 398,366.

My invention relates to a hose clamp and the principal object of my invention is, to provide a relatively simple, strong, durable and efficient device for clamping and securing the ends of hose and especially the heavier types of hose that are utilized in connection with the circulation pumps of deep well drilling rigs and which hose it will be understood are required to carry extremely high fluid pressures.

Further objects of my invention are, to generally improve upon and simplify the construction of the existing forms of hose clamps and connections, further, to provide a clamp and connection that may be readily applied for use and further, to provide a hose clamp that will make it practically impossible to forcibly remove the hose from the nipple or tubular member to which it is secured.

With the foregoing and other objects in view, my invention consists in certain novel features of construction and arrangement of parts that will hereinafter be more fully described and claimed and illustrated in the accompanying drawing, in which:

Figure 1:
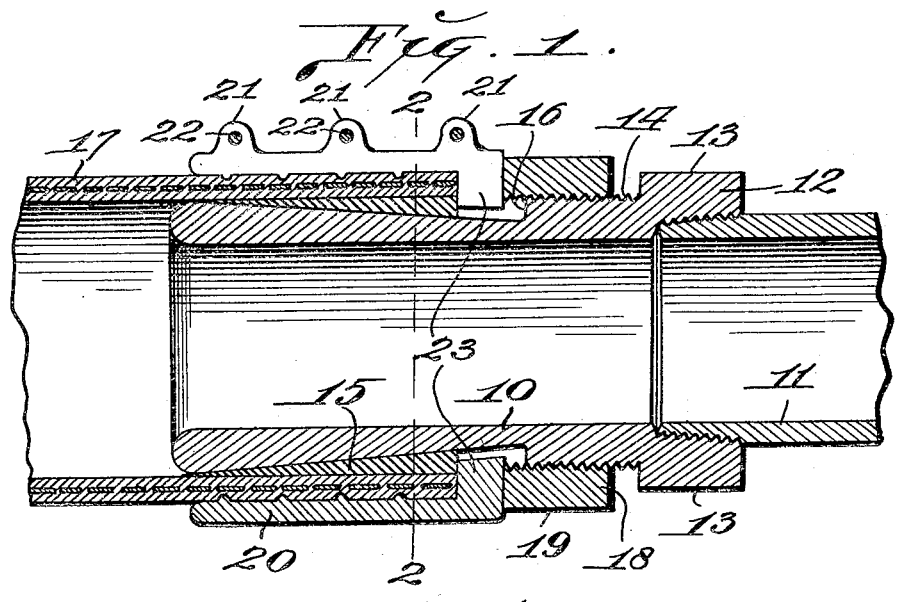
Fig. 1 is a vertical longitudinal section taken through the center of a hose clamp and connection constructed in accordance with my invention.
Figure 2:
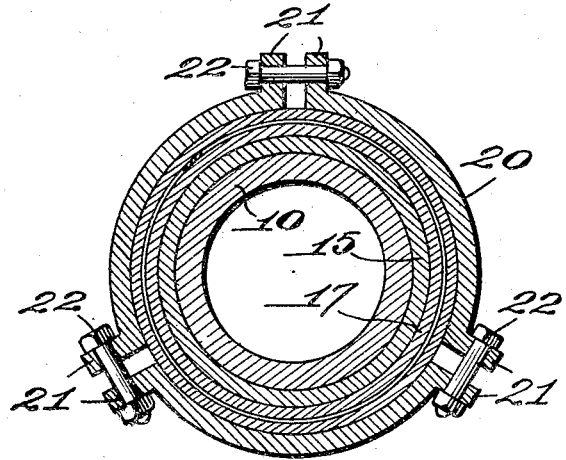
Fig. 2 is a cross section taken on the line 2—2 of Fig. 1.

Referring by numerals to the accompanying drawings, which illustrate a practical embodiment of my invention, 10 designates a tubular member or nipple into one end of which is screwed a pipe 11 that is connected to a pump or other source of fluid pressure and the end of the tube or nipple 10 that receives pipe 11 is enlarged to form a head 12 and this head is provided with flat wrench receiving faces 13.

A portion of the body of the tubular member 10, adjacent to the head 12, is externally threaded, as designated by 14 and the external surface of that portion between the threaded portion 14 and the end of the tube or nipple opposite the end that is provided with head 13 is tapered so that it gradually increases in diameter toward its outer end.

Fitting snugly upon the externally tapered portion of the tube or nipple 10 is a sleeve or ring 15, the wall of which gradually decreases in thickness from one end to the other and this sleeve or ring is arranged on the tapered portion of tube 10 so that the thick end of said ring encircles the end of the tapered portion of tube 10 that has the least diameter. Sleeve or ring 15 is composed of compressible elastic material such as rubber and its base or end having the greatest thickness is disposed a short distance away from the shoulder 16 that is formed on member 10 between the tapered portion thereof and the threaded portion 14. When sleeve 15 is fitted on the tapered portion of tube 10 its external diameter is uniform throughout its length and after being fitted unto the tube 10 said elastic sleeve or ring and the tapered end of member 10 are inserted in the end of the hose 17 that is to be connected to member 11.

A nut 18, having externally arranged flat wrench receiving faces 19, is mounted on the threaded portion 14 of tube 10.

A clamping ring 20 is preferably formed in three segments and the ends of said segments being provided with outwardly projecting perforated lugs 21 that receive bolts 22, encircles the end of the hose that receives the end of tube 10 and the sleeve 15 and formed integral with the inner ends of the segments that comprise this clamping ring are inwardly projecting flanges 23 that bear against the ends of hose 17 and sleeve 15.

To assemble and secure the parts of the hose clamp, sleeve 15 is positioned on the externally tapered portion of tube 10 and said sleeve and that portion of the tube 10 on which said sleeve is mounted are inserted in the end of hose 17. The segments of the clamping ring are now positioned around the end of the hose with the flanges 23 bearing against the ends of said hose and sleeve.

After the nuts on the bolts 22 have been tightened to clamp ring 20 around the end of the hose, nut 18 is screwed outwardly on the threaded portion 14 of tube 10, thereby bearing against the flanges 23 on the inner ends of the segments of the clamping ring and the latter will be forced outwardly a corresponding distance so as to compress the sleeve 15 and this compression is aided by the expansion produced in said sleeve as the same moves outwardly on the gradually enlarged outer end portion of tube 10.

This combined compression and expansion of sleeve 15 on the interior of the end of the hose and the external pressure of the sectional clamping ring 20 will very firmly clamp the end of the pipe on the tube 15, thereby producing a fluid pressure tight joint and at the same time producing a strong substantial connection that will readily withstand relatively high pressures such as are carried by the hose that connect the pump with the circulation system of deep well drilling rigs.

Thus it will be seen that I have provided a hose clamp and connection that is relatively simple in construction, inexpensive of manufacture and very effective in performing the functions for which it is intended.

It will be understood that minor changes in the size, form and construction of the various parts of my improved hose clamp and connection may be made and substituted for those herein shown and described without departing from the spirit of my invention, the scope of which is set forth in the appended claims.

I claim as my invention:

1. In a hose clamp, a tubular member having an externally arranged tapered portion, a sleeve of compressible material arranged on the tapered portion of said tube the wall of which sleeve gradually decreases in thickness towards one end, which sleeve and tapered portion of the tube are adapted to be positioned in the end of a hose, a clamping ring encircling the end of the hose in which said tube and sleeve are positioned and means for moving said clamping ring lengthwise of said tube.

2. In a hose clamp, a tubular member having an externally arranged tapered portion, a sleeve of compressible material arranged on the tapered portion of said tube the wall of which sleeve gradually decreases in thickness towards one end, which sleeve and tapered portion of the tube are adapted to be positioned in the end of a hose, a clamping ring encircling the end of the hose in which said tube and sleeve are positioned and a nut mounted on an externally threaded portion of said sleeve for engaging the inner end of said clamping ring and moving the same lengthwise relative to said tube.

3. In a hose clamp, a tube provided on one end with a head, the opposite end portion of the tube being externally tapered, a sleeve of compressible material encircling the tapered portion of said tube the wall of which sleeve gradually decreases in thickness towards one end, which sleeve and tapered portion of the tube are adapted to be inserted in the end of the hose, a clamping ring encircling the end of the hose in which said sleeve and tapered portion of the tube are inserted and a nut mounted on a threaded portion of the tube between said head and the externally tapered portion for engaging the inner end of said clamping ring and moving the same lengthwise relative to said tube.

4. In a hose clamp, a tube having an externally arranged tapered portion, a sleeve of compressible material arranged on the tapered portion of said tube, which sleeve and tapered portion of the tube are adapted to be inserted in a hose, a sectional clamping ring encircling the end of the hose in which said sleeve and tapered portion of the tube are inserted, flanges projecting inwardly from the sections of the clamping ring and bearing against the ends of said sleeve and hose and means for moving said sectional clamping ring longitudinally of said tube.

5. In a hose clamp, a tube having an externally arranged tapered portion, a sleeve of compressible material arranged on the tapered portion of said tube, which sleeve and tapered portion of the tube are adapted to be inserted in a hose, a sectional clamping ring encircling the end of the hose in which said sleeve and tapered portion of the tube are inserted, flanges projecting inwardly from the sections of the clamping ring and bearing against the ends of said sleeve and hose and a nut mounted on a threaded portion of the tube for engaging the flanges on the sections of said clamping ring and forcing the latter lengthwise relative to said tube.

In testimony whereof I affix my signature.

RALPH L. CHAPMAN.